(12) United States Patent  (10) Patent No.: US 7,403,062 B2
Tain                             (45) Date of Patent:     Jul. 22, 2008

(54) DUAL EDGE MODULATED CHARGE PUMPING CIRCUIT AND METHOD

(75) Inventor: Ya-Der Tain, Taipei County (TW)

(73) Assignee: Aimtron Technology Corp., Hsinchu (TW)

( * ) Notice: Subject to any disclaimer, the term of this patent is extended or adjusted under 35 U.S.C. 154(b) by 29 days.

(21) Appl. No.: 11/613,181

(22) Filed: Dec. 19, 2006

(65) Prior Publication Data

US 2008/0143424 A1    Jun. 19, 2008

(51) Int. Cl.
    *G05F 1/10*    (2006.01)
(52) U.S. Cl. ........................................ 327/536
(58) Field of Classification Search .................. 327/536
    See application file for complete search history.

(56) References Cited

U.S. PATENT DOCUMENTS

| 6,483,377 | B2 * | 11/2002 | White et al. ................. 327/536 |
| 6,518,829 | B2 * | 2/2003 | Butler .......................... 327/536 |
| 6,822,884 | B1 * | 11/2004 | Rosenthal et al. ............. 363/59 |
| 7,075,356 | B2 * | 7/2006 | Mayama et al. ............. 327/536 |
| 7,288,984 | B2 * | 10/2007 | Armaroli et al. ............ 327/536 |
| 7,304,529 | B2 * | 12/2007 | Armaroli et al. ............ 327/536 |
| 7,324,358 | B2 * | 1/2008 | Fujiwara ....................... 363/60 |

* cited by examiner

*Primary Examiner*—Jeffrey S Zweizig
(74) *Attorney, Agent, or Firm*—Winston Hsu (57) ABSTRACT

Dual edge modulated charge pumping circuit has an output terminal, a charge pumping conversion circuit, and a dual edge modulated control circuit. The charge pumping conversion circuit has a first capacitor, a second capacitor, and a switch combination circuit. The second capacitor is coupled between the output terminal and a ground potential. The dual edge modulated control circuit controls the switch combination circuit such that the charge pumping conversion circuit operates with a first phase, a second phase, a third phase, and a fourth phase. During the first phase, a first electrode of the first capacitor is floated. During the second phase, the first capacitor is coupled between the ground potential and an input voltage. During the third phase, the first capacitor is coupled between the input voltage and the output terminal. During the fourth phase, the first electrode of the first capacitor is floated.

12 Claims, 6 Drawing Sheets

DUAL EDGE MODULATED CHARGE PUMPING CIRCUIT AND METHOD

BACKGROUND OF THE INVENTION

1. Field of the Invention

The present invention relates to a charge pumping circuit and method, more particularly, to a dual edge modulated charge pumping circuit and method.

2. Description of the Related Art

Figure 1A:
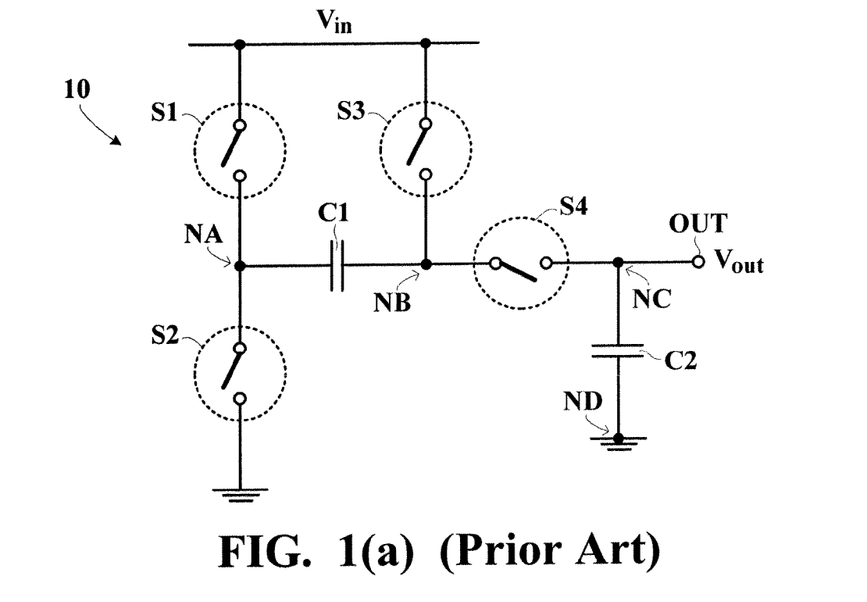
FIG. 1(a) is a schematic diagram showing a conventional charge pumping circuit.

FIG. 1(a) is a schematic diagram showing a conventional charge pumping circuit 10. Referring to FIG. 1(a), the conventional charge pumping circuit 10 primarily has a first capacitor C1, a second capacitor C2, and a switch combination circuit. More specifically, the switch combination circuit consists of a first switch S1, a second switch S2, a third switch S3, and a fourth switch S4. The first switch S1 is coupled between an input voltage $V_{in}$ and a first electrode NA of the first capacitor C1. The second switch S2 is coupled between the first electrode NA of the first capacitor C1 and a ground potential. The third switch S3 is coupled between the input voltage $V_{in}$ and a second electrode NB of the first capacitor C1. The fourth switch S4 is coupled between the second electrode NB of the first capacitor C1 and an output terminal OUT. The second capacitor C2 has a first electrode NC coupled to the output terminal OUT, and in turn also coupled to the fourth switch S4. The second capacitor C2 has a second electrode ND coupled to the ground potential.

The operation of the conventional charge pumping circuit 10 includes a first phase and a second phase. During the first phase, the first and the fourth switches S1 and S4 are both turned OFF and the second and the third switches S2 and S3 are both turned ON, such that the first electrode NA of the first capacitor C1 is coupled to the ground potential and the second electrode NB of the first capacitor C1 is coupled to the input voltage $V_{in}$. As a result, the first capacitor C1 is charged during the first phase so as to develop a potential difference of $V_{in}$ across the second and the first electrodes NB and NA. Thereafter followed with the second phase, the first and the fourth switches S1 and S4 are both turned ON and the second and the third switches S2 and S3 are both turned OFF, such that the first electrode NA of the first capacitor C1 is coupled to the input voltage $V_{in}$ and the second electrode NB of the first capacitor C1 is coupled to the output terminal OUT. As a result, the voltage at the second electrode NB of the first capacitor C1 is abruptly pulled from $V_{in}$ up to $2*V_{in}$ at the beginning of the second phase. Through the conductive fourth switch S4, this voltage $2*V_{in}$ is applied to the output terminal OUT such that the conventional charge pumping circuit 10 may effectively provide an output voltage of $2*V_{in}$.

Figure 1B:
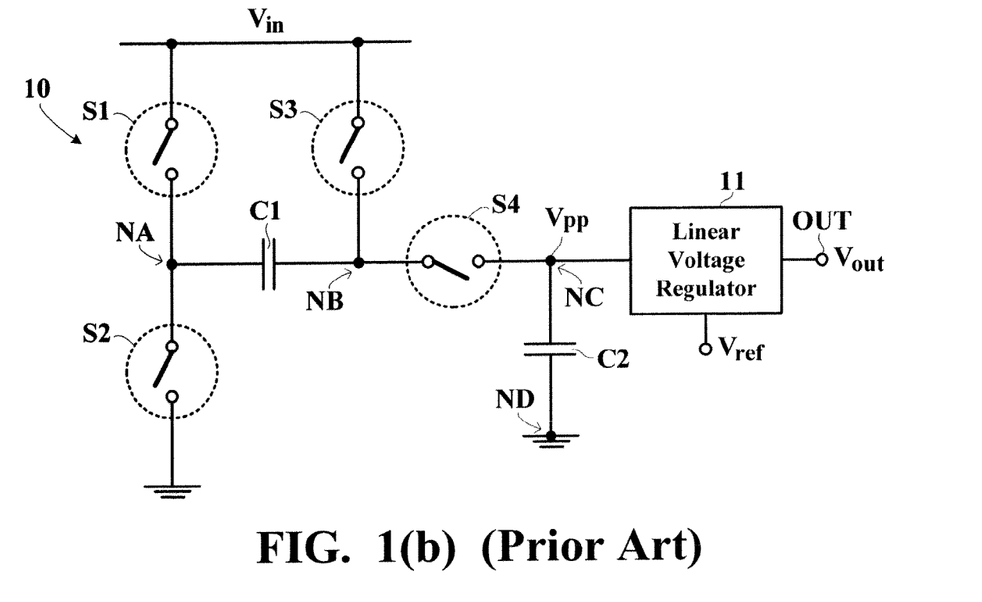
FIG. 1(b) is a schematic diagram showing another conventional charge pumping circuit provided with a linear voltage regulator.

The charge pumping circuit 10 shown in FIG. 1(a) has a shortcoming with respect to the only capability of providing an output voltage $V_{out}$ fixed at $2*V_{in}$. In order to generate an adjustable output voltage $V_{out}$ within a range from $V_{in}$ to $2*V_{in}$, a linear voltage regulator 11 must be additionally provided between the first electrode NC of the second capacitor C2 and the output terminal OUT, as shown in FIG. 1(b). Based on a predetermined reference voltage $V_{ref}$, the linear voltage regulator 11 converts a pumping voltage $V_{pp}$ at the first electrode NC of the second capacitor C2 into an output voltage $V_{out}$ between $V_{in}$ and $2*V_{in}$. Although the linear voltage regulator 11 effectively converts the fixed pumping voltage $V_{pp}$ into the adjustable output voltage $V_{out}$ between $V_{in}$ and $2*V_{in}$, the linear voltage regulator 11 causes a reduction to the power converting efficiency and thus wastes energy.

SUMMARY OF THE INVENTION

In view of the above-mentioned problems, an object of the present invention is to provide a dual edge modulated charge pumping circuit and method for generating an adjustable output voltage without using a linear voltage regulator, thereby maintaining a high efficiency of power conversion and saving energy.

According to one aspect of the present invention, a dual edge modulated charge pumping circuit includes an output terminal, a charge pumping conversion circuit, and a dual edge modulated control circuit. The output terminal provides an output voltage. The charge pumping conversion circuit has a first capacitor, a second capacitor, and a switch combination circuit. The second capacitor is coupled between the output terminal and a ground potential. The dual edge modulated control circuit controls the switch combination circuit so as to operate the charge pumping conversion circuit with a first phase, a second phase, a third phase, and a fourth phase. A first electrode of the first capacitor is floated during the first phase. The first capacitor is coupled between the ground potential and an input voltage during the second phase. The first capacitor is coupled between the input voltage and the output terminal during the third phase. The first electrode of the first capacitor is floated during the fourth phase.

According to another aspect of the present invention, a dual edge modulated charge pumping method includes the following steps. A second capacitor is coupled between an output terminal and a ground potential. During a first phase, a first electrode of a first capacitor is floated. During a second phase, the first capacitor is coupled between the ground potential and an input voltage. During a third phase, the first capacitor is coupled between the input voltage and the output terminal. During a fourth phase, the first electrode of the first capacitor is floated. In response to a change of an output voltage at the output terminal, an operation time of the second phase and an operation time of the third phase are both modulated.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION OF THE PREFERRED EMBODIMENTS

Figure 2:
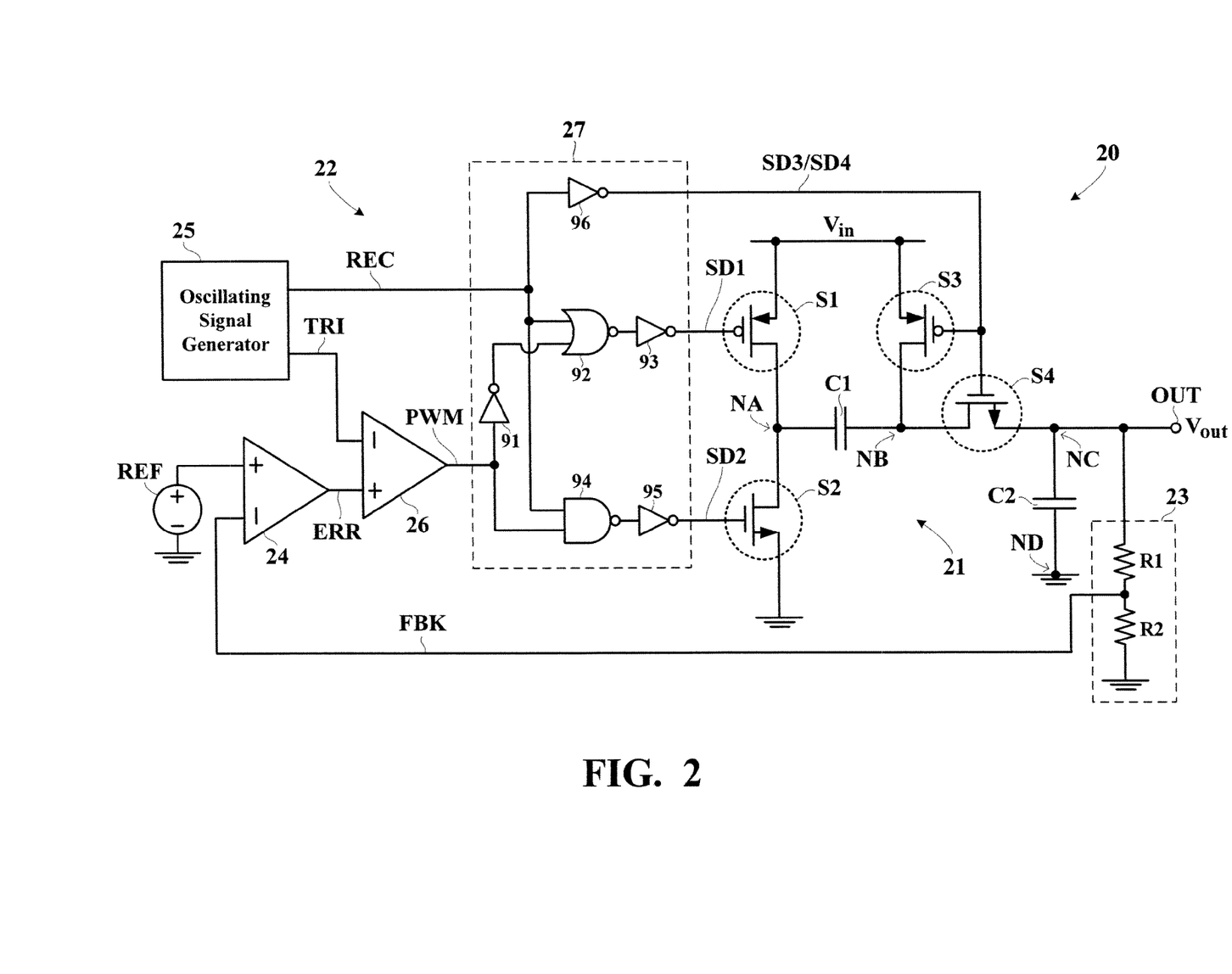
FIG. 2 is a detailed circuit diagram showing a dual edge modulated charge pumping circuit according to a first embodiment of the present invention.

The preferred embodiments according to the present invention will be described in detail with reference to the drawings. FIG. 2 is a detailed circuit diagram showing a dual edge modulated charge pumping circuit 20 according to a first embodiment of the present invention. Referring to FIG. 2, the dual edge modulated charge pumping circuit 20 has a charge pumping conversion circuit 21 and a dual edge modulated control circuit 22. Under the control of the dual edge modulated control circuit 22, the charge pumping conversion circuit 21 effectively converts an input voltage $V_{in}$ into an adjustable output voltage $V_{out}$, wherein the polarity of the output voltage $V_{out}$ is the same as the polarity of the input voltage $V_{in}$ and the absolute value of the output voltage $V_{out}$ is between $V_{in}$ and $2*V_{in}$.

The charge pumping conversion circuit 21 primarily has a first capacitor C1, a second capacitor C2, and a switch combination circuit. More specifically, the switch combination circuit consists of a first switch S1, a second switch S2, a third switch S3, and a fourth switch S4. The first switch S1 is coupled between the input voltage $V_{in}$ and the first electrode NA of the first capacitor C1. The second switch S2 is coupled between the first electrode NA of the first capacitor C1 and the ground potential. The third switch S3 is coupled between the input voltage $V_{in}$ and the second electrode NB of the first capacitor C1. The fourth switch S4 is coupled between the second electrode NB of the first capacitor C1 and the output terminal OUT. The first electrode NC of the second capacitor C2 is coupled to the output terminal OUT, and in turn also coupled to the fourth switch S4. The second electrode ND of the second capacitor C2 is coupled to the ground potential. In the embodiment shown in FIG. 2, the first and the third switches S1 and S3 are both implemented by PMOS transistors while the second and the fourth switches S2 and S4 are both implemented by NMOS transistors.

The dual edge modulated control circuit 22 primarily has a feedback circuit 23, an error amplifier 24, an oscillating signal generator 25, a pulse width modulation comparator 26, and a control signal generating circuit 27. The feedback circuit 23 is coupled to the output terminal OUT for generating a feedback signal FBK representative of the output voltage $V_{out}$ at the output terminal OUT. In the embodiment shown in FIG. 2, the feedback circuit 23 may be implemented by a voltage divider made up of two series-connected resistors R1 and R2. The error amplifier 24 has an inverting input terminal and a non-inverting input terminal, wherein the inverting input terminal receives the feedback signal FBK from the feedback circuit 23 and the non-inverting input terminal receives a reference signal REF. The reference signal REF may be implemented by a predetermined voltage signal or a user-adjustable voltage signal, which determines the output voltage $V_{out}$. Based on a difference between the feedback signal FBK and the reference signal REF, the error amplifier 24 generates an error signal ERR. The oscillating signal generator 25 generates a triangular oscillating signal TRI and a rectangular signal REC in synchronization with respect to each other. The pulse width modulation comparator 26 has an inverting input terminal and a non-inverting input terminal, wherein the inverting input terminal receives the triangular oscillating signal TRI from the oscillating signal generator 25 and the non-inverting input terminal receives the error signal ERR from the error amplifier 24. Based on a comparison between the error signal ERR and the triangular oscillating signal TRI, the pulse width modulation comparator 26 generates a pulse width modulation signal PWM. In response to the rectangular oscillating signal REC and the pulse width modulation signal PWM, the control signal generating circuit 27 generates a first to a fourth control signals SD1 to SD4, for being respectively applied to the first to the fourth switches S1 to S4 in order to turn them ON/OFF.

In the embodiment shown in FIG. 2, the pulse width modulation signal PWM is applied to one input terminal of a NOR logic gate 92 through an inverter 91, and the rectangular oscillating signal REC is applied to another input terminal of the NOR logic gate 92. An output terminal of the NOR logic gate 92 generates the first control signal SD1 through an inverter 93. The pulse width modulation signal PWM is applied to one input terminal of a NAND logic gate 94, and the rectangular oscillating signal REC is applied to another input terminal of the NAND logic gate 94. An output terminal of the NAND logic gate 94 generates the second control signal SD2 through an inverter 95. The third control signal SD3 and the fourth control signal SD4 are the same with respect to each other and both generated from the rectangular oscillating signal REC through an inverter 96.

Hereinafter is described in detail an operation of a dual edge modulated charge pumping circuit 20 according to the first embodiment. First of all, the triangular oscillating signal TRI and the rectangular oscillating signal REC generated from the oscillating signal generator 25 are explained. In the embodiment shown in FIG. 3, a waveform 30 represents the triangular oscillating signal TRI and a waveform 60 represents the rectangular oscillating signal REC. The waveforms 30 and 60 are in such synchronization that peaks of the waveform 30 correspond to rising edges of the waveform 60 and valleys of the waveform 30 correspond to falling edges of the waveform 60.

Figure 3:
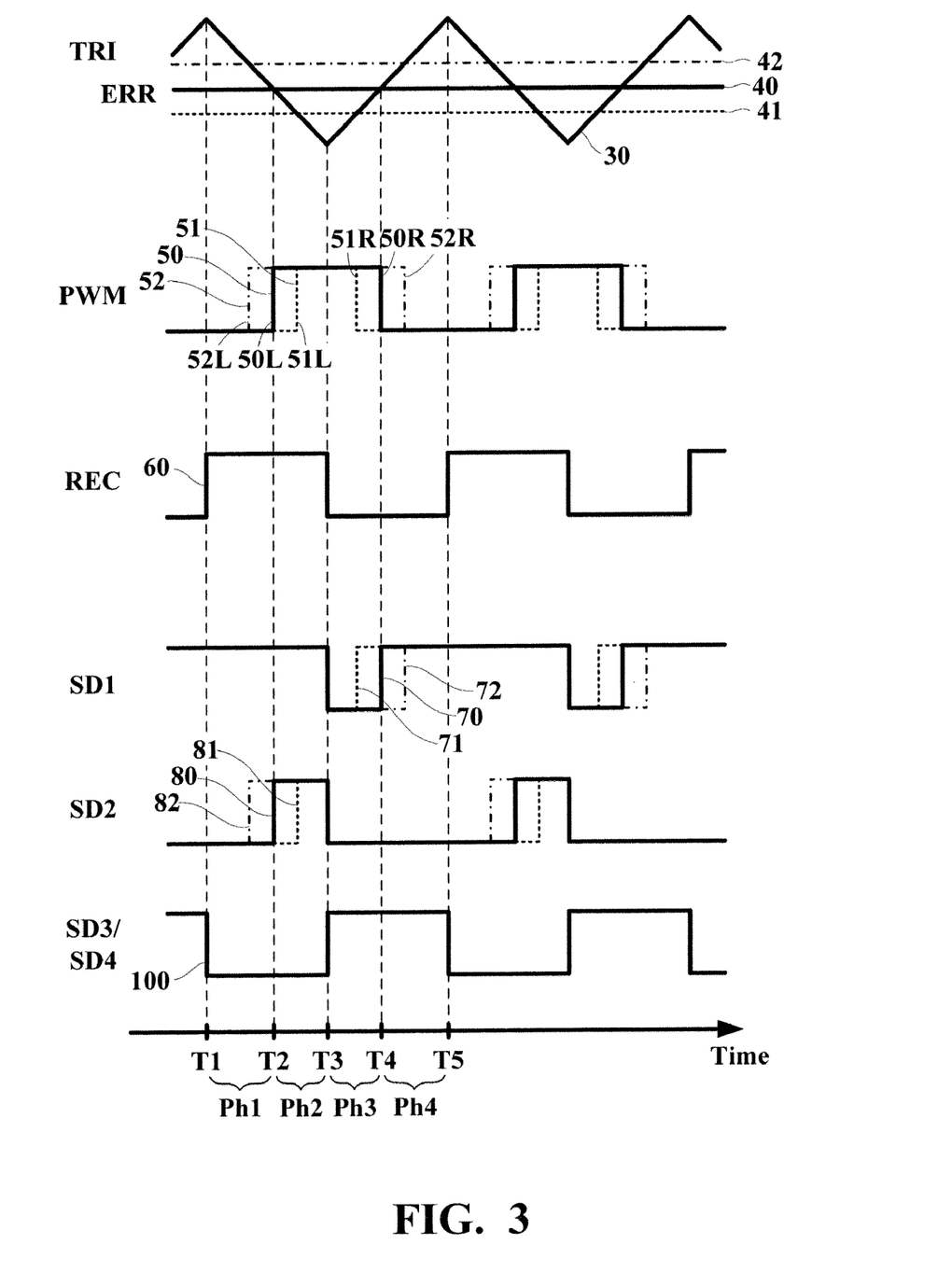
FIG. 3 is a waveform timing chart showing an operation of a dual edge modulated charge pumping circuit according to a first embodiment of the present invention.

If a waveform 40 represents the error signal ERR generated from the error amplifier 24, then the pulse width modulation signal PWM generated from the pulse width modulation comparator 26 will be represented by a waveform 50. More specifically, the pulse width modulation signal PWM is at the low level when the triangular oscillating signal TRI is larger than the error signal ERR, and the pulse width modulation signal PWM is at the high level when the triangular oscillating signal TRI is smaller than the error signal ERR. Due to the symmetrical characteristic of the triangular oscillating signal TRI, the high level pulse of the pulse width modulation PWM is symmetrical with respect to the valley of the triangular oscillating signal TRI. The control signal generating circuit 27 retrieves out the right half of the high level pulse and turns it into the first control signal SD1, as represented by a waveform 70, and retrieves out the left half of the high level pulse and turns it into the second control signal SD2, as represented by a waveform 80. The control signal generating circuit 27 directly inverts the waveform 60 of the rectangular oscillating signal REC so as to generate the third control signal SD3 and the fourth control signal SD4, as represented by a waveform 100.

As clearly appreciated from the first to the fourth control signals SD1 to SD4 of FIG. 3, the operation of the dual edge modulated charge pumping circuit 20 according to the present invention consists of a first to a fourth phases Ph1 to Ph4. During the first phase Ph1 from time T1 to T2, the first control signal SD1 is at the high level, the second control signal SD2 is at the low level, and the third and the fourth control signals SD3 and SD4 are both at the low level. As a result, the first, the second, and the fourth switches S1, S2, and S4 are all turned OFF, and only is the third switch S3 turned ON, such that the first electrode NA of the first capacitor C1 is floated and the second electrode NB of the first capacitor C1 is coupled to the input voltage $V_{in}$. The first capacitor C1 is neither charged nor discharged during the first phase Ph1 since the first electrode NA of the first capacitor C1 is floated.

During the second phase Ph2 from time T2 to T3, the first control signal SD1 is at the high level, the second control signal SD2 is at the high level, and the third and the fourth control signals SD3 and SD4 are both at the low level. As a result, the first and the fourth switches S1 and S4 are both turned OFF and the second and the third switches S2 and S3 are both turned ON, such that the first electrode NA of the first capacitor C1 is coupled to the ground potential and the second electrode NB of the first capacitor C1 is coupled to the input voltage $V_{in}$. The first capacitor C1 is continuously charged during the second phase Ph2 so as to gradually develop a potential difference $dV_{C1}$ across the first capacitor C1. The value eventually reached by the potential difference $dV_{C1}$ is determined by the operation time of the second phase Ph2, i.e., the period of time from time T2 to T3. The longer the operation time of the second phase Ph2 is, the higher the potential difference $dV_{C1}$ is developed across the first capacitor C1. The shorter the operation time of the second phase Ph2 is, the lower the potential difference $dV_{C1}$ is developed across the first capacitor C1. Therefore, the potential difference $dV_{C1}$ at the end of the second phase Ph2 is actually adjustable between 0 and $V_{in}$.

During the third phase Ph3 from time T3 to T4, the first control signal SD1 is at the low level, the second control signal SD2 is at the low level, and the third and the fourth control signals SD3 and SD4 are both at the high level. As a result, the first and the fourth switches S1 and S4 are both turned ON and the second and the third switches S2 and S3 are both turned OFF, such that the first electrode NA of the first capacitor C1 is coupled to the input voltage $V_{in}$ and the second electrode NB of the first capacitor C1 is coupled to the output terminal OUT. Hence, the second electrode NB of the first capacitor C1 is also coupled to the first electrode NC of the second capacitor C2. At the beginning of the third phase Ph3, the voltage at the second electrode NB of the first capacitor C1 is abruptly pulled from $dV_{C1}$ up to $(V_{in}+dV_{C1})$. Afterward, the second capacitor C2 is continuously charged so as to gradually develop a potential difference $dV_{C2}$ across the second capacitor C2. The value eventually reached by the potential difference $dV_{C2}$ is determined by the operation time of the third phase Ph3, i.e., the period of time from time T3 to T4. The longer the operation time of the third phase Ph3 is, the higher the potential difference $dV_{C2}$ is developed across the second capacitor C2. The shorter the operation time of the third phase Ph3 is, the lower the potential difference $dV_{C2}$ is developed across the second capacitor C2. More specifically, the potential difference $dV_{C2}$ at the end of the third phase Ph3 can reach $(V_{in}+dV_{C1})$ at maximum.

During the fourth phase Ph4 from time T4 to T5, the first control signal SD1 is at the high level, the second control signal SD2 is at the low level, and the third and the fourth control signals SD3 and SD4 are both at the high level. As a result, the first, the second, and the third switches S1, S2, and S3 are all turned OFF, and only is the fourth switch S4 turned ON, such that the first electrode NA of the first capacitor C1 is floated and the second electrode NB of the first capacitor C1 is coupled to the output terminal OUT. Hence, the second electrode NB of the first capacitor C1 is also coupled to the first electrode NC of the second capacitor C2. The first capacitor C1 stops charging the second capacitor C2 during the fourth phase Ph4 since the first electrode NA of the first capacitor C1 is floated.

Hereinafter is assumed that the output voltage $V_{out}$ is subjected to a rising change, due to which the error signal ERR from the error amplifier 24 shifts from the waveform 40 down to the waveform 41. In this case, the pulse's width of the pulse width modulation signal PWM becomes as narrower as represented by a waveform 51, such that the pulse's width of the first control signal SD1 becomes as narrower as represented by a waveform 71 and the second control signal SD2 becomes as narrower as represented by a waveform 81. It should be noted that the waveform 71 is modulated in correspondence with the right edge 51R of the waveform 51 and the waveform 81 is modulated in correspondence with the left edge 51L of the waveform 51, which clearly demonstrates the dual edge modulated characteristic of the present invention. Because the pulse's widths of the first and the second control signals SD1 and SD2 are both narrowed such that the operation times of the first and the second control signals SD1 and SD2 are both shortened, the potential difference $dV_{C1}$ developed across the first capacitor C1 and the potential difference $dV_{C2}$ developed across the second capacitor C2 both become lower. As a result, the output voltage $V_{out}$ may be reduced and then restored to the original target value.

Hereinafter is assumed that the output voltage $V_{out}$ is subjected to a falling change, due to which the error signal ER from the error amplifier 24 shifts from the waveform 40 up to the waveform 42. In this case, the pulse's width of the pulse width modulation signal PWM becomes as wider as represented by a waveform 52, such that the pulse's width of the first control signal SD1 becomes as wider as represented by a waveform 72 and the second control signal SD2 becomes as wider as represented by a waveform 82. It should be noted that the waveform 72 is modulated in correspondence with the right edge 52R of the waveform 52 and the waveform 82 is modulated in correspondence with the left edge 52L of the waveform 52, which clearly demonstrates the dual edge modulated characteristic of the present invention. Because the pulse's widths of the first and the second control signals SD1 and SD2 are both widened such that the operation times of the first and the second control signals SD1 and SD2 are both prolonged, the potential difference $dV_{C1}$ developed across the first capacitor C1 and the potential difference $dV_{C2}$ developed across the second capacitor C2 both become higher. As a result, the output voltage $V_{out}$ may be raised and then restored to the original target value.

As apparently recognized from the embodiment shown in FIG. 3, the dual edge modulated charge pumping circuit and method according to the present invention has at least the following characteristics. In response to the rising change of the output voltage $V_{out}$, the operation time of the second phase Ph2 and the operation time of the third phase Ph3 are both shortened. In response to the falling change of the output voltage $V_{out}$, the operation time of the second phase Ph2 and the operation time of the third phase Ph3 are both prolonged. The operation time of the second phase Ph2 is equivalent to the operation time of the third phase Ph3. A sum of the operation time of the first phase Ph1 and the operation time of the second phase Ph2 is fixed, which corresponds to the falling portion of the triangular oscillating signal TRI. A sum of the operation time of the third phase Ph3 and the operation time of the fourth phase Ph4 is fixed, which corresponds to the rising portion of the triangular oscillating signal TRI.

Figure 4:
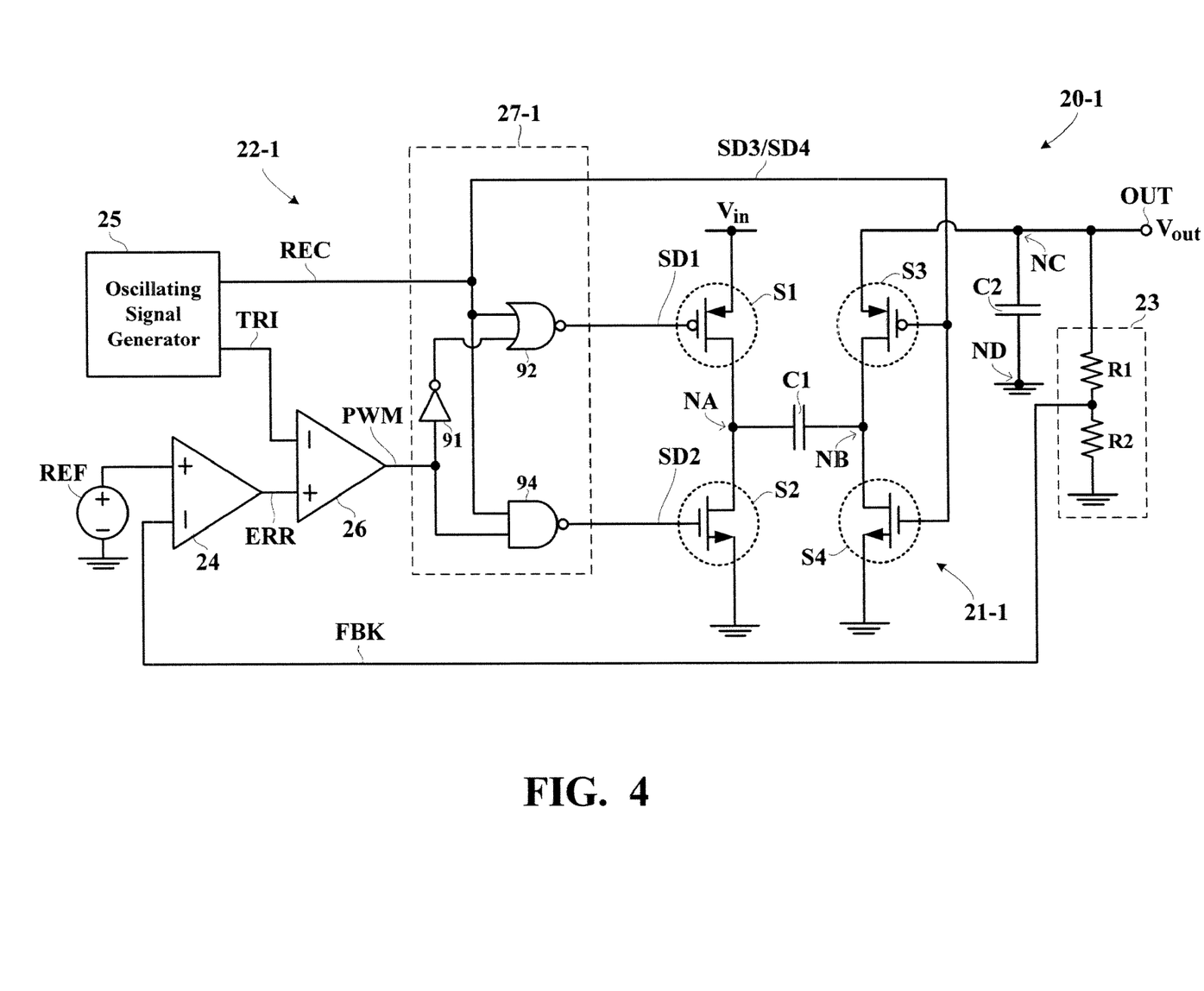
FIG. 4 is a detailed circuit diagram showing a dual edge modulated charge pumping circuit according to a second embodiment of the present invention.

FIG. 4 is a detailed circuit diagram showing a dual edge modulated charge pumping circuit 20-1 according to a second embodiment of the present invention. Referring to FIG. 4, the dual edge modulated charge pumping circuit 20-1 has a charge pumping conversion circuit 21-1 and a dual edge modulated control circuit 22-1. Under the control of the dual edge modulated control circuit 22-1, the charge pumping conversion circuit 21-1 effectively converts an input voltage $V_{in}$ into an adjustable output voltage $V_{out}$, wherein the polarity of the output voltage $V_{out}$ is opposite to the polarity of the input voltage $V_{in}$ and the absolute value of the output voltage $V_{out}$ is between 0 and $V_{in}$. It should be noted that in the charge pumping conversion circuit 21-1 of the second embodiment, the third switch S3 is coupled between the output terminal OUT and the second electrode NB of the first capacitor C1 and the fourth switch S4 is coupled between the second electrode NB of the first capacitor C1 and the ground potential. Hereinafter is described in detail that an operation of the dual edge modulated charge pumping circuit 20-1 of the second embodiment. During a first phase, the first switch S1 is turned OFF, the second switch S2 is turned OFF, the third switch S3 is turned OFF, and the fourth switch S4 is turned ON, such that the first electrode NA of the first capacitor C1 is floated and the second electrode NB of the first capacitor C1 is coupled to the ground potential. During a second phase, the first switch S1 is turned ON, the second switch S2 is turned OFF, the third switch S3 is turned OFF, and the fourth switch S4 is turned ON, such that the first electrode NA of the first capacitor C1 is coupled to the input voltage $V_{in}$ and the second electrode NB of the first capacitor C1 is coupled to the ground potential. During a third phase, the first switch S1 is turned OFF, the second switch S2 is turned ON, the third switch 53 is turned ON, and the fourth switch S4 is turned OFF, such that the first electrode NA of the first capacitor C1 is coupled to the ground potential and the second electrode NB of the first capacitor C1 is coupled to the output terminal OUT. During a fourth phase, the first switch S1 is turned OFF, the second switch S2 is turned OFF, the third switch S3 is turned ON, and the fourth switch S4 is turned OFF, such that the first electrode NA of the first capacitor C1 is floated and the second electrode NB of the first capacitor C1 is coupled to the output terminal OUT.

Figure 5:
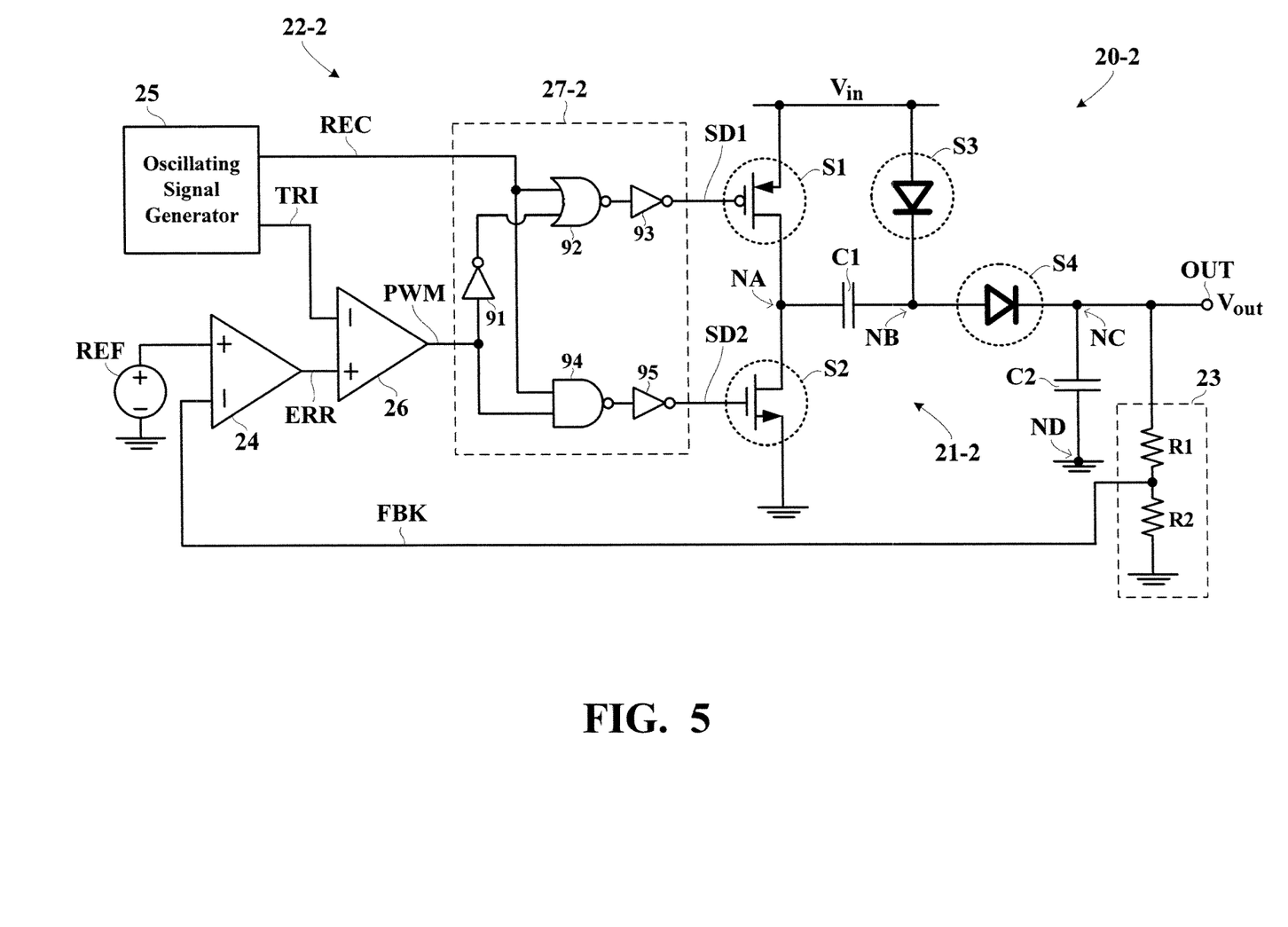
FIG. 5 is a detailed circuit diagram showing a dual edge modulated charge pumping circuit according to a third embodiment of the present invention.

FIG. 5 is a detailed circuit diagram showing a dual edge modulated charge pumping circuit 20-2 according to a third embodiment of the present invention. Referring to FIG. 5, the dual edge modulated charge pumping circuit 20-2 has a charge pumping conversion circuit 21-2 and a dual edge modulated control circuit 22-2. Under the control of the dual edge modulated control circuit 22-2, the charge pumping conversion circuit 21-2 effectively converts an input voltage $V_{in}$ into an adjustable output voltage $V_{out}$, wherein the polarity of the output voltage $V_{out}$ is the same as the polarity of the input voltage $V_{in}$ and the absolute value of the output voltage $V_{out}$ is between $V_{in}$ and $2*V_{in}$. The third embodiment is different from the first embodiment in that the third switch S3 and the fourth switch S4 of the charge pumping conversion circuit 21-2 of the third embodiment are both implemented by diodes. Therefore, the dual edge modulated control circuit 22-2 needs not to provide the third and the fourth control signals SD3 and SD4.

Figure 6:
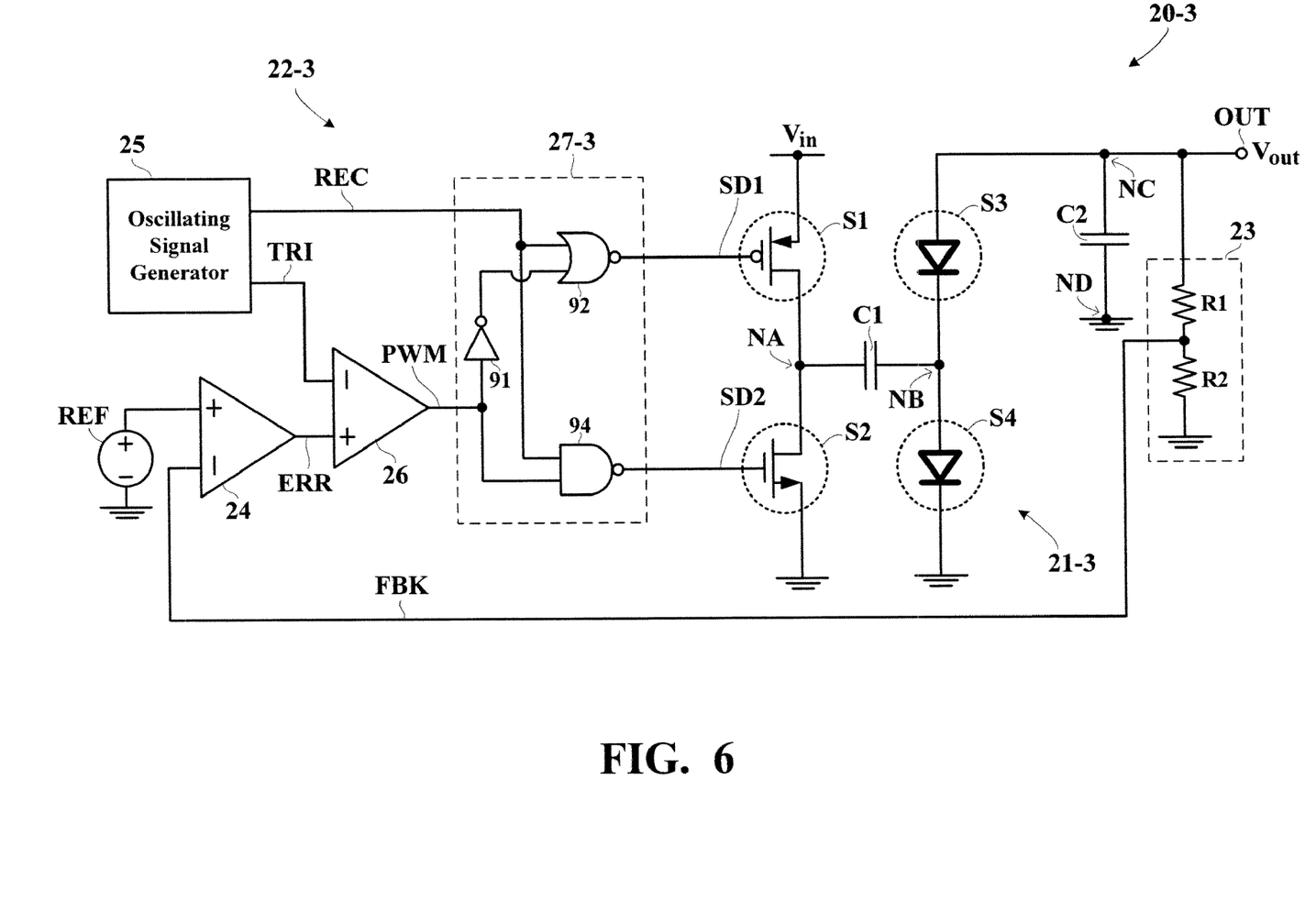
FIG. 6 is a detailed circuit diagram showing a dual edge modulated charge pumping circuit according to a fourth embodiment of the present invention.

FIG. 6 is a detailed circuit diagram showing a dual edge modulated charge pumping circuit 20-3 according to a fourth embodiment of the present invention. Referring to FIG. 6, the dual edge modulated charge pumping circuit 20-3 has a charge pumping conversion circuit 21-3 and a dual edge modulated control circuit 22-3. Under the control of the dual edge modulated control circuit 22-3, the charge pumping conversion circuit 21-3 effectively converts an input voltage $V_{in}$ into an adjustable output voltage $V_{out}$, wherein the polarity of the output voltage $V_{out}$ is opposite to the polarity of the input voltage $V_{in}$ and the absolute value of the output voltage $V_{out}$ is between 0 and $V_{in}$. The fourth embodiment is different from the second embodiment in that the third switch S3 and the fourth switch S4 of the charge pumping conversion circuit 21-3 of the fourth embodiment are both implemented by diodes. Therefore, the dual edge modulated control circuit 22-3 needs not to provide the third and the fourth control signals SD3 and SD4.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A dual edge modulated charge pumping circuit, comprising:
   an output terminal for providing an output voltage;
   a charge pumping conversion circuit having a first capacitor, a second capacitor, and a switch combination circuit, in which the second capacitor is coupled between the output terminal and a ground potential; and
   a dual edge modulated control circuit for controlling the switch combination circuit so as to operate the charge pumping conversion circuit with a first phase, a second phase, a third phase, and a fourth phase,
   wherein:
   a first electrode of the first capacitor is floated during the first phase;
   the first capacitor is coupled between the ground potential and an input voltage during the second phase;
   the first capacitor is coupled between the input voltage and the output terminal during the third phase;
   the first electrode of the first capacitor is floated during the fourth phase;
   the dual edge modulated control circuit modulates an operation time of the second phase and an operation time of the third phase in response to a change of the output voltage; and
   the operation time of the second phase is equivalent to the operation time of the third phase.

2. The circuit according to claim 1, wherein:
   the operation time of the second phase and the operation time of the third phase are both shortened in response to a rising change of the output voltage, and
   the operation time of the second phase and the operation time of the third phase are both prolonged in response to a falling change of the output voltage.

3. The circuit according to claim 2, wherein:
   a sum of an operation time of the first phase and the operation time of the second phase is fixed, and
   a sum of the operation time of the third phase and an operation time of the fourth phase is fixed.

4. The circuit according to claim 1, wherein:
   during the first phase, the switch combination circuit causes a second electrode of the first capacitor to be coupled to the input voltage, and
   during the fourth phase, the switch combination circuit causes the second electrode of the first capacitor to be coupled to the output terminal.

5. The circuit according to claim 4, wherein:
   the switch combination circuit comprises:
   a first switch coupled between the input voltage and the first electrode of the first capacitor;
   a second switch coupled between the first electrode of the first capacitor and the ground potential;
   a third switch coupled between the input voltage and the second electrode of the first capacitor; and
   a fourth switch coupled between the second electrode of the first capacitor and the output terminal.

6. The circuit according to claim 1, wherein:
during the first phase, the switch combination circuit causes a second electrode of the first capacitor to be coupled to the ground potential, and
during the fourth phase, the switch combination circuit causes the second electrode of the first capacitor to be coupled to the output terminal.

7. The circuit according to claim 6, wherein:
the switch combination circuit comprises:
  a first switch coupled between the input voltage and the first electrode of the first capacitor;
  a second switch coupled between the first electrode of the first capacitor and the ground potential;
  a third switch coupled between the output terminal and the second electrode of the first capacitor; and
  a fourth switch coupled between the second electrode of the first capacitor and the ground potential.

8. A dual edge modulated charge pumping method, comprising:
coupling a second capacitor between an output terminal and a ground potential;
floating a first electrode of a first capacitor during a first phase;
coupling the first capacitor between the ground potential and an input voltage during a second phase;
coupling the first capacitor between the input voltage and the output terminal during a third phase;
floating the first electrode of the first capacitor during a fourth phase; and
modulating an operation time of the second phase and an operation time of the third phase in response to a change of an output voltage at the output terminal, wherein:
the operation time of the second phase is equivalent to the operation time of the third phase.

9. The method according to claim 8, wherein:
the operation time of the second phase and the operation time of the third phase are both shortened in response to a rising change of the output voltage, and
the operation time of the second phase and the operation time of the third phase are both prolonged in response to a falling change of the output voltage.

10. The method according to claim 8, wherein:
a sum of an operation time of the first phase and the operation time of the second phase is fixed, and
a sum of the operation time of the third phase and an operation time of the fourth phase is fixed.

11. The method according to claim 8, further comprising:
coupling a second electrode of the first capacitor to the input voltage during the first phase, and
coupling the second electrode of the first capacitor to the output terminal during the fourth phase.

12. The method according to claim 8, further comprising:
coupling a second electrode of the first capacitor to the ground potential during the first phase, and
coupling the second electrode of the first capacitor to the output terminal during the fourth phase.

* * * * *